United States Patent [19]

Schnellmann

[11] 3,722,768
[45] Mar. 27, 1973

[54] APPARATUS FOR OPENING FILM CASSETTES

[75] Inventor: Oskar Schnellmann, Zurich, Switzerland

[73] Assignee: Gretag Aktiengesellschaft, Regensdorf, Switzerland

[22] Filed: Sept. 24, 1971

[21] Appl. No.: 183,340

[30] Foreign Application Priority Data

Sept. 25, 1970 Switzerland..................14267/70

[52] U.S. Cl....................................225/105, 225/93
[51] Int. Cl. .................................B26f 3/00
[58] Field of Search..........225/93, 105, 104, 103, 96, 225/5, 1, 2; 214/305

[56] References Cited

UNITED STATES PATENTS

| 3,407,948 | 10/1968 | Gutzmer | 214/305 |
| 3,548,478 | 12/1970 | Blackman | 225/93 X |
| 3,580,443 | 5/1971 | Hennig et al. | 225/96.5 |
| 3,587,954 | 6/1971 | Pierce | 225/93 |

*Primary Examiner*—Frank T. Yost
*Attorney*—Pierce, Scheffler & Parker

[57] ABSTRACT

A device for opening film cassettes which have a housing formed with two spool chambers and a web therebetween, comprising, two stub spindles, a clamping means and ejector combined therewith, and impacting means, all movable relative to one another by drive means. The drive means are controlled first to move the two stub spindles into axial alignment in clamping position on a take-up spool of a film cassette. Thereafter the cassette is moved to engage the take-up spool housing in the clamping means and the impacting means is then activated to break the cassette into two parts one of which is retained in the clamping means. The spindles and take-up spool are now separated from the clamped take-up spool housing which is then ejected by the ejector. Thereafter the spindles can be opened to remove the spool and the process can be repeated.

6 Claims, 4 Drawing Figures

Fig.1

APPARATUS FOR OPENING FILM CASSETTES

BACKGROUND OF THE INVENTION

This invention relates to a device for opening film cassettes having a housing formed with two spool chambers and a web therebetween.

Film cassettes have a housing formed with two spool chambers interconnected by a web, and are usually made of two parts joined together provided with rupture lines to allow the housing to be broken up after use to free the film spool. An example of such a cassette is the "126" film cassette.

Devices for opening film cassettes must be very accurate and reliable in operation, firstly because they have to be used in darkness or by dim red light, so that it is difficult to check their correct functioning, and secondly because the increasing use of fully automatic film processing units is continually requiring increased speed of operation. Previously suggested devices for opening film cassettes do not fully meet these requirements.

In one suggested device the take-up spool of a cassette which has been fixed in position is engaged by two stub spindles which extend into the spool from both sides thereof, whereafter the take-up spool is pulled out of the cassette by the stud spindles moving perpendicularly to the spool axis. The main disadvantage of this device is that when the take-up spool is pulled out, the cassettes often fail to break along their proper rupturing lines and pieces of the cassette remain on the take-up spool.

Another suggested device for opening cassettes has a motor-driven disc having a central pin and two diametrically opposite arcuate blades mounted thereon. Adjacent the disc is a spindle on which the take-up spool of the film cassette to be opened is placed so that the cassette is disposed between the disc pin and one of the blades. After the cassette has been thus fitted, the spindle is rotated so that any film still remaining on the payoff spool or in the cassette web is transferred to the take-up spool. During the following 180° rotation of the disc one of the two blades knocks off the cassette web near the take-up spool. It has been found in practice that even in this system cassette parts remain hanging on the take-up spool. Also to automate the location of the cassette to be opened and the removal of the opened spools requires a relatively large technical effort.

SUMMARY OF INVENTION

To overcome the disadvantages mentioned the invention provides a device for opening a film cassette which has a housing formed with two spool chambers and a web therebetween, of use more particularly for "126" film cassettes, the device comprising a first and second rotatable stub spindle, the second stub spindle being mounted opposite to, and in alignment with the first stub spindle. The two stub spindles are mounted on a common mounting and can be moved relatively to one another by means of a first drive to clamp the take-p spool of a film cassette. The device also comprises clamping means combined with an ejector for the take-up spool housing of the cassette; the said mounting and the take-up spool clamping means can be so moved relatively to one another by means of a second drive that in one particular position the line interconnecting the two stub spindles extends through the jaw of the take-up spool clamping means. Impacting means are also provided which is operable by a third drive and which is directed towards the web of the film cassette retained by the stub spindles. The drives are so interconnected that the following events occur seriatim: (a) the two stub spindles are moved apart from one another so that a film cassette can be introduced; (b) they are moved together to clamp the take-up spool; (c) the two stub spindles and the clamping means are moved into the position in which the line interconnecting the two stub spindles extends through the jaw of the clamping means; (d) the impacting means is operated; (e) the two stub spindles and the clamping means are moved away from one another, and (f) the two stub spindles are moved apart from one another; and the ejector of the clamping means is operated on or after initiation of phase (e). The first stub spindle may also be rotatable by a fourth drive.

BRIEF DESCRIPTION OF THE DRAWINGS

A preferred embodiment of the invention will be described in greater detail hereinafter with reference to the drawings wherein:

Figure 1:
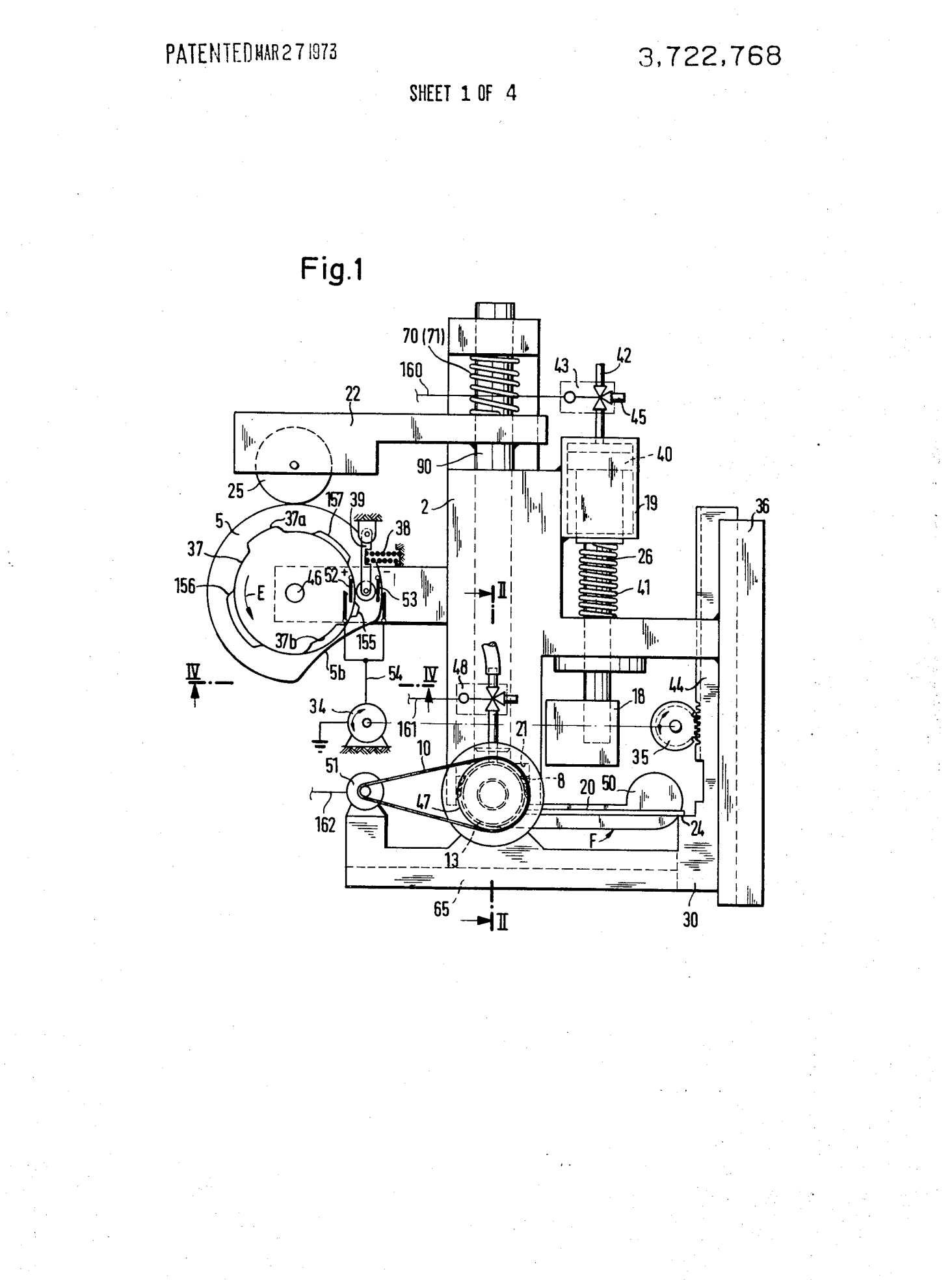

FIG. 1 shows a device for opening film cassettes in side elevation;

DESCRIPTION OF THE PREFERRED EMBODIMENT

Figure 2:
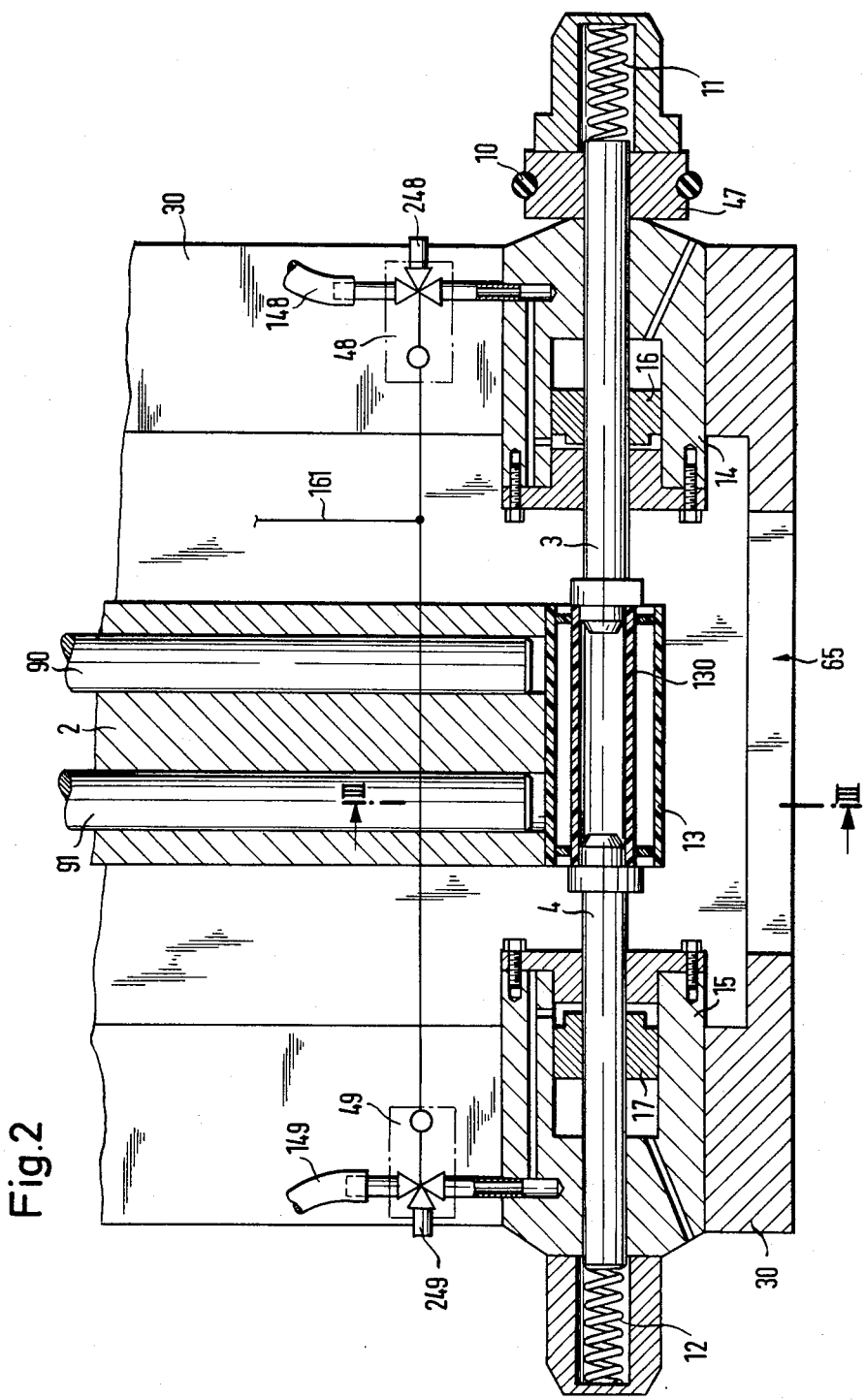
FIG. 2 is a section on the line II'II of FIG. 1.
Figure 3:
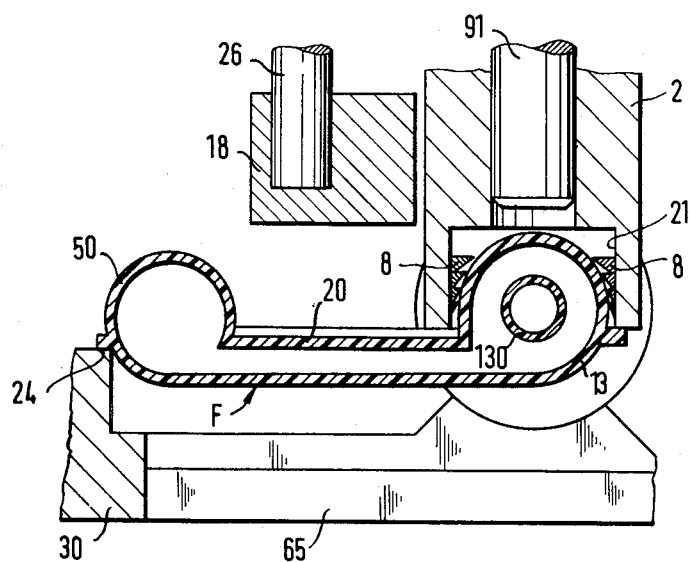
FIG. 3 is a section on the line III—III of FIG. 2.
Figure 4:
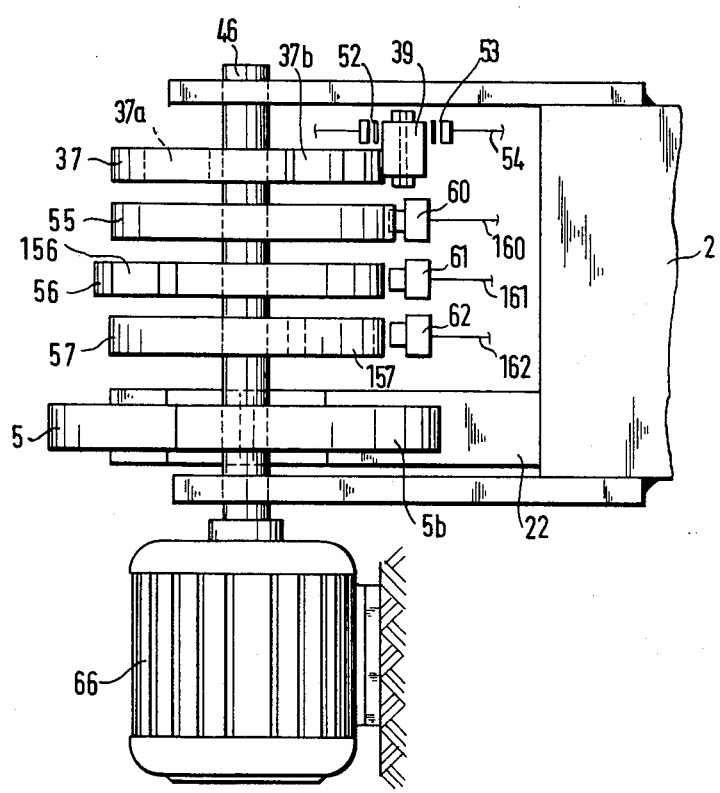
FIG. 4 is a view, looking in the direction of the two arrows IV of FIG. 1, of that part of the device which is disposed between the arrows.

The device shown comprises two rotatable stub spindles 3, 4 which are in axial alignment with one another and which take the form of piston rods associated with pneumatic cylinders 14, 15. A motor 51 can drive stub spindle 3 by way of a belt 10 and pulley 47. Each of the two cylinders 14, 15 can be connected as desired either to a compressed-air source (not shown) via a respective line 148, 149 or to atmosphere for discharge via a respective pipe stub 248, 249. A compression type return spring 11, 12 respectively is associated with each of the spindles 3, 4 to oppose the force of the compressed air. Cylinders 14, 15 and motor 51 are all mounted on a common mounting 30 which is mounted for vertical movement in a guide 36 secured to or forming a part of the body of the device. The mounting 30 engages by way of a rack 44 with a pinion 35 adapted to be driven reversibly by a motor 34. The motor 34 and pinion 35 are also mounted on the body of the device.

Two pins 90, 91 are mounted for vertical movement, in a common plane with the two spindles 3, 4, in a component 2 which is either rigidly secured to or forms part of the body. The tops of the two pins 90, 91 are rigidly secured to a perpendicularly projecting arm 22 whose free end engages by way of a roller 25 with a cam disc 5 adapted to be driven by a shaft 46 and motor 66 in a direction indicated by arrow E. Compression springs 70, 71 threaded on the pins 90, 91 respectively maintain roller 25 in continuous contact with cam disc 5. Component 2 has a jaw 21 at its lower end formed with saw teeth 8 and which is of a size and design such as to be adapted to effect a vise-like retention of a take-up spool 130 of a "126" type film cassette F. The guide bores of the two pins 90, 91 extend into jaw 21, and the pins 90, 91 also extend thereinto near the lowermost position of their vertical travel.

A third pin 26 is mounted for vertical movement in component 2 parallel to the two pins 90, 91 and can be driven by a compressed air drive. The compressed air drive comprises a cylinder 19 which can be connected by means of a three-way magnetically operated valve 43 either to the compressed-air source (not shown) via a line 42 or to discharge via a pipe stub 45. Pin 26 is connected to a piston 40 of a cylinder 19 and is also acted on by a compression return spring 41. At the lower end of pin 26 is a hammer 18 which together with the pin 26 is so positioned as to be aimed at a web 20 of the "126" type film cassette F whose take-up spool housing is clamped horizontally in jaw 21 and whose pay-off spool housing 50 bears on a support member 24 of mounting 30, the hammer 18 shattering the web 20 at the lowest position of its travel.

A cam disc 37 which is mounted on a spindle 46 and which has a raised portion 37a and a recessed portion 37b controls the vertical movement of mounting 30. Engaging with the periphery of disc 37 is a resilient feeler, in the form of a pivoted lever 39 with a freely rotatable roller at its end. A compression spring 38 biases the roller into engagement with the periphery of disc 37. Lever 39 can operate either of two switches 52, 53, switch 52 being connected to the positive side of a d.c. supply and switch 53 to the negative side thereof. The two switches 52, 53 are also connected via a common lead 54 to one of the two supply terminals of motor 34, the other terminal thereof being grounded. Consequently, the motor 34 adapted to move the mounting 30 vertically is rotated clockwise or anticlockwise according to the position into which lever 39 pivots. While the lever 39 is in its central position contacting that part of the cam disc periphery which is between the raised part 37a and the recessed part 37b the two switches 52, 53 are open and so the motor 34 is stationary. When raised part 37a engages with the roller of lever 39, the same pivots anticlockwise and closes switch 53 so that motor 34 runs clockwise. When the recessed part 37b engages with the roller of lever 39, switch 52 closes and the motor runs anticlockwise. When running anticlockwise motor 34 raises mounting 30 by way of pinion 35 and rack 44 and lowers mounting 30 when running clockwise.

Three other cam discs 55, 56, 57 each having a respective cam 155, 156, 157 are secured to the spindle 46 to operate the magnetically operated valves 43, 48, 49 and the motor 51. The actuator of a respective microswitch 60, 61, 62 is disposed in the trajectory of each cam 155–157 respectively. Cam 155 acts via microswitch 60 and wiring 160 to operate valve 43, cam 156 acts via microswitch 61 and wiring 161 to operate valves 48, 49, and cam 157 acts via microswitch 62 and wiring 162 to operate motor 51. Cam 155 triggers the vertical movement of the hammer 18; after an adjustably predetermined time the hammer 18 is reset automatically by spring 41. Cam 156 is longer than cam 155, so that the two stud spindles 3, 4 are moved apart from one another and remain in their moved-apart position for as long as the cam contacts the actuator of microswitch 61, whereafter springs 11, 12 move the two spindles 3, 4 towards one another. Cam 157 is of about the same length as cam 156 and makes the drive shaft of motor 51 rotate for the time that cam 157 is in contact with the actuator of microswitch 62.

In the phase of operations shown, all the switches 52, 53 and 60–62 are open. The control is so designed that the two motors 34, 51 are in this case stationary and all the valves 40, 48, 49 discharge their associated cylinders. Consequently, the two stub spindles 3, 4 are moved towards one another by springs 11, 12 and their free ends engage the core of take-up spool 130 of a film cassette F. The pins 90, 91, 26 are in their uppermost positions of vertical travel. Upon further rotation of spindle 46 (FIG. 1) by motor 66, cam 155 operates microswitch 60 which via wiring 160 operates valve 43 to allow compressed air to go through line 42 into cylinder 19, so that piston 40 descends against the force of spring 41. Hammer 18 strikes web 20 of cassette F and shatters the same into a bottom part and a top part along standard rupture lines. Initially, the top part is retained by jaw 21 and the take-up spool 130 is retained between stub spindles 3 and 4. The remainder of the cassette drops out of the device through aperture 65 in mounting 30. After a predetermined adjustable time interval has elapsed, cylinder 19 is connected to discharge automatically by way of valve 43 and pipe stub 45, so that spring 41 can raise piston 40. Upon further rotation of spindle 46, lever 39 engages with the recessed part 37b of cam disc 37 to close switch 52, so that motor 51 is energized via wiring 54 to run to lower carrier 30, spool 130 being pulled downwardly out of jaw 21, whereafter roller 25 engages with recessed part 5b of cam disc 5 and acts via arms 22 to lower pins 90, 91 so that the same eject the top half of the film cassette F which is still clamped in jaw 21. Upon further rotation of spindle 46, cam 156 acts by way of microswitch 61 and wiring 161 to change the two valves 48, 49 over from discharge to charging with compressed air, so that the two stub spindles 3, 4 move away from one another and spool 130 is released. The spindles 3, 4 remain apart from one another for as long as cam 156 is in contact with the actuator of microswitch 61. The length of cam 156 is such that after release of spool 130 the spindles 3, 4 remain apart from one another long enough to receive a new film cassette F either manually or preferably by means of an appropriate mechanism. When cam 156 disengages from microswitch 61, the two valves 48, 49 change over from charging with compressed air to discharge, so that the springs 11, 12 can move the two stub spindles 3, 4 towards one another to clamp take-up spool 130 of a new cassette F. When spindle 46 leaves the position last described, raised part 37a of cam disc 37 engages with lever 39 to pivot it clockwise and close switch 53, so that motor 51 is energized via line 54 to run anticlockwise to raise carrier 30, and take-up spool housing 13 of cassette F moves upwards into and is clamped in jaw 21. When spindle 46 rotates further cam 157 operates microswitch 62 which acts via wiring 162 to energize motor 51. Motor 51 remains "on" for as long as cam 157 remains in contact with microswitch 62, the motor 51 driving stub spindle 3 via belt 10 and pulley 47, so that all the film in the cassette F is taken up on the take-up spool 130. This marks a return to the phase of operations illustrated in the drawings.

It will be seen that the device above described ensures that the cassette is first broken open along its predetermined rupture lines and then both the lower and upper half of the cassette are separately removed from the take-up spool, in contrast to the prior art, thus ensuring that parts of the cassette housing do not adhere to the spool.

Of course, the embodiment described and shown can be carried into practice with a wide variety of constructional variants. For instance, the two stub spindles 3, 4 could be moved relative one another by means of a motor, and rack and pinion system. Also, the impacting movement of the hammer 18 could be produced by the release of energy from a spring and resetting of the hammer could be by means of an electromagnet. The mounting 30 for the two stub spindles 3, 4 could be so devised that the stub spindles are pivoted to move in a curved path relative to one another. The stub spindles 3, 4 or their mountings can be adapted to remove the cassettes directly from a magazine and supply them to the jaw 21. Alternatively, the cassettes can be supplied to the stub spindles 3, 4 via a fixed conveying path in the form, e.g., in the part near the spindles 3 and 4, of a slide which is pulled back to open the aperture 65 after each clamping of a cassette by the spindles 3, 4 to allow the lower part of the cassette to be ejected after impacting by the hammer 18.

What is claimed is:

1. A device for opening film cassettes which have a housing formed with two spool chambers and a web therebetween, comprising:

rotatable first and second stub spindles movably mounted on a common mounting;

first drive means for moving the first and second stub spindles relative to one another between a first position in which they are in axial alignment and adapted to engage in and thereby clamp in position the take-up spool of a film cassette with the take-up spool being rotatable with the spindles, and a second position in which the stub spindles are separated to allow a film cassette to be positioned between them;

clamping means provided with an ejector and adapted to engage and clamp the take-up spool housing of the film cassette;

second drive means for moving the mounting and the clamping means relative to one another between a disengaged position of the clamping means and an engaged position of the clamping means in which the clamping means engages the take-up spool housing of the film cassette;

impacting means activated by;

third drive means to impact against the web of the film cassette to break open the cassette housing;

and means for controlling the drive means to achieve the following steps in sequence:
a. separating the stub spindles to receive a film cassette therebetween;
b. bringing the stub spindles into clamping engagement with the take-up spool of the film cassette;
c. moving the stub spindles and their mounting relative to the clamping means to bring the clamping means into clamping engagement with the take-up spool housing;
d. causing the impacting means to strike the web of the cassette and break open the cassette housing;
e. separating the stub spindles and their mounting from the clamping means;
f. separating the stub spindles to free the take-up spool;

the ejector of the clamping means being operated on or after initiation of step (e).

2. A device as claimed in claim 1 wherein the stub spindle mounting is formed with a support member for the supply spool of the film cassette.

3. A device as claimed in claim 1 wherein the first stub spindle is rotatable by a fourth drive means and the second stub spindle is freely rotatable, and said fourth drive means being activated by the control means after completion of step (b) and before initiation of step (d).

4. A device as claimed in claim 3 wherein the step (d) of operating the impacting means only takes place after the fourth drive has been running a predetermined time.

5. A device as claimed in claim 3 wherein the means for controlling the drive means is provided by a set of cam discs coaxially mounted for rotation together.

6. A device as claimed in claim 5 wherein a cam disc is also provided for operating the ejector.

* * * * *